Aug. 17, 1965    F. C. MATH    3,200,588
JET REACTION MOTOR
Filed Feb. 26, 1963    2 Sheets-Sheet 1

Inventor
Friedrich F. Math
By Michael S. Striker
Attorney

Aug. 17, 1965  F. C. MATH  3,200,588
JET REACTION MOTOR
Filed Feb. 26, 1963  2 Sheets-Sheet 2

United States Patent Office 3,200,588
Patented Aug. 17, 1965

3,200,588
JET REACTION MOTOR
Friedrich C. Math, 6079 Buchschlag, Pirschweg, Germany
Filed Feb. 26, 1963, Ser. No. 262,815
8 Claims. (Cl. 60—39.35)

The present invention relates to jet propulsion motors and has for a main object improvements over other known types of such motors and consisting in the provision of means to conduct the compression, the combustion and the expansion of gas within a single rotor disc which is rotating in the center of a double radial cold air stream, and then expelling the mixture consisting of the hot and cold gas through further expansion nozzles provided in the casing to produce thrust energy.

Most modern jet motor types consist of separated compressors, burning chambers and turbines, therefore show large overall dimensions, complicated build-up and high losses along the gas channels.

According to the present invention the rotor of the motor is utilized firstly in compressing the air prior to combustion, to burn the air and driving the rotor by emitting the gases by their reaction on jets provided at the periphery of the rotor, secondly in accelerating two radial cold air streams above and underneath the rotor to realize the surplus energy generated by the rotor and at the same time suspending the rotor completely in air.

Since conventional jet motor types must have rigid bearings to support the several compressor and turbine discs, they are liable to wear and have many loss sources, and also need highly precise and expensively machined parts. With such conventional designs, furthermore, a high total weight compared to the effect is created, and many control devices and much maintenance and repair efforts are necessary.

All of these disadvantages met with the conventional designs of jet engines are avoided by the present invention, in which design the compression, burning and turbine process are combined within of one single rotor rotating in the center of a case without touching it anywhere. The rotor is kept in position within the case only by the forces of the air stream enveloping the rotor and running along the walls inside.

Other objects will become apparent after reading the following description in connection with the accompanying drawings illustrating the invention by means of an example rather than in the sense of a limitation and wherein;

FIGURE 1 is a vertical cross section of the self propelling rotor showing it with a rigid hollow shaft 1, the hollow center plate 2 and the interior of two opposite compression-combustion chambers 3 with rotor drive nozzles.

Figure 1:
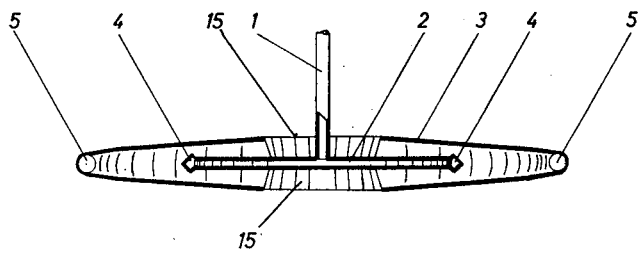
Figure 4:
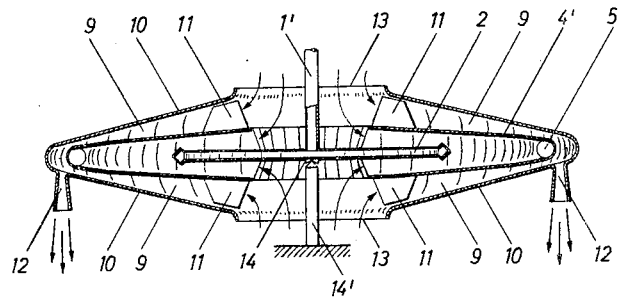

FIGURE 4 is a horizontal cross section of a rotor similar to FIGURE 1, but with vanes 11 on the inner periphery for acceleration of the bypass air stream 9 flowing between the rotor and the housing 10 having vertically attached thrust nozzles 12.

Figure 5:
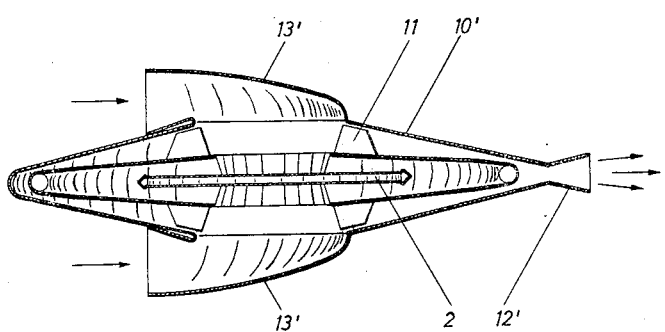

FIGURE 5 is a horizontal cross section of a rotor similar to FIGURE 4 but with horizontally attached thrust nozzles 12 on the housing 10 and intake air stream guide shells 13.

Figure 6:
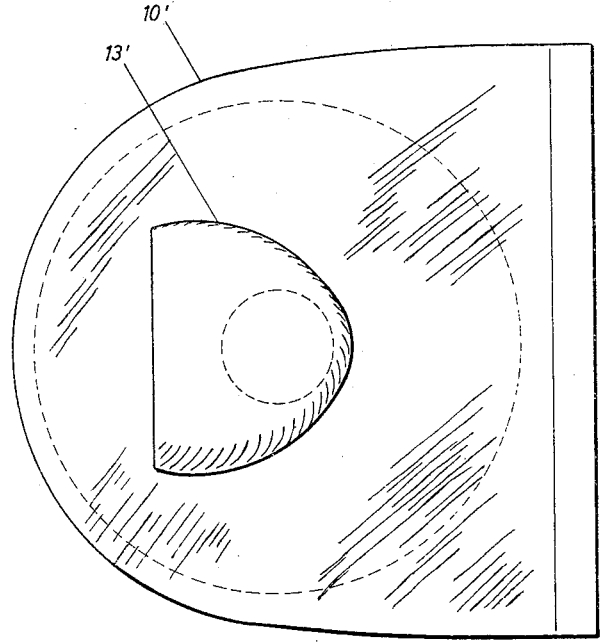

FIGURE 6 is a top view of the engine of FIGURE 5.

Figure 2:
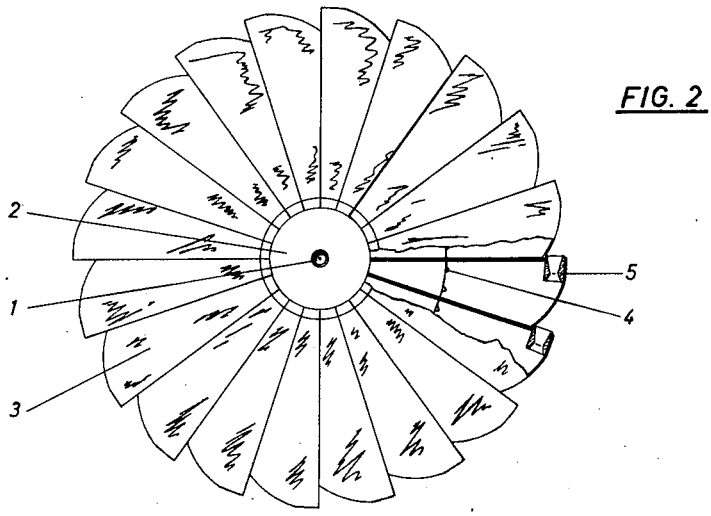
FIGURE 2 is a top view of a rotor similar to FIGURE 1.
Figure 3:
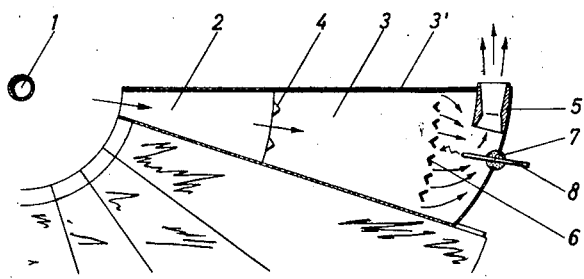
FIGURE 3 is a vertical cross section of a single compression-combustion chamber showing the interior build up.

In the drawings, in which like characters of reference designate like or similar parts, FIGURES 1, 2 and 3 illustrate the simplest possible form of a motor consisting only of a rigid hollow shaft 1 with attached hollow center disc 2 and compression-combustion chambers 3 formed between adjacent partitions 3' extending between the top and bottom walls of the housing surrounding the disc, in which the fuel spray nozzles 4 and the rotor drive nozzles 5 as well as the flame holders 6, the insulator 7 and the spark electrode rod 8 are built in.

Provided the hollow shaft 1 is held by ball bearings etc. and connected to a fuel source, fuel will flow through it and enter the hollow central disc 2 where the fuel is pressed by the centrifugal forces through the fuel spray nozzles 4 and becomes mixed with the air stream inside the compression-combustion chambers 3. Near the outer periphery there are flame holders 6 inside the chamber 3 where the burning gas flame initially ignited by an electrical spark between a flame holder and the electrode rod 8, is constantly burning. The burnt gases are then expelled through the rotor drive nozzles 5 and drive the rotor, which uses a part of this rotational energy to constantly suck new air into the central openings 15 on the inner end of the chambers 3. While another part of this energy is used to overcome the drag losses the remaining energy will appear on the shaft as net engine power.

FIGURE 4 illustrates a rotor similar to FIGURES 1–3, but without the shaft 1. Instead of this the rotor 4' is supported by the air streams 9 flowing in radial direction between the rotor and the casing 10 and entering the latter through air inlet opening 13. These air streams are generated by the vanes 11 attached on the rotor and using up all its surplus rotational energy to accelerate the air streams 9. These air streams will produce the effect, that their static pressure rises when the gap beween one side of the rotor and the casing becomes closer because of a misalignment, respectively falls, when the gap becomes wider. This way the rotor 4' will be perfectly supported and constantly centered, while running, with respect to the casing 10. During standing or slow rotating of the rotor an emergency needle 14' and shell bearing 14 is pivoted underneath the center disc 2. In this design the fuel for the motor may be provided through an elastic flexible tube 1' entering from above into the center disc 2.

Between the outer peripheries of the rotor and the casing 10 in the air stream 9 and exhaust gases expelled from the rotor drive nozzles 5 are mixed and flow through the thrust nozzles 12 whereby the mixture becomes completely expanded. This way an upward thrust is produced acting on the case of the engine.

FIGURES 5 and 6 illustrate an engine similar to FIGURE 4 but with a thrust nozzle 12' horizontally attached to the casing 10' direct the exhaust mixture gases into one common horizontal direction so that a horizontal thrust is produced on the casing 10' of the engine. The air inlet means 13' of the casing 10' are curved and inlet openings thereof face in a direction opposite to that of the thrust nozzle 12'.

The special advantages of such jet engines according to my invention are the following:

(a) The losses in the air channels, as well in the compression-combustion chambers are low because of the simplicity of shape and relatively low velocities. Furthermore the expansion of the combustion gases is performed by Laval rotor drive nozzles 5 having very high efficiency. Also the gases expelled by the rotor drive nozzles 5 have a low rest velocity because of their high rotational speed.

(b) The actual thrust produced by the thrust nozzles 12 in the case is relatively high because of the additional bypass airstream 9 which lowers the jet velocity and its temperature and therefore gives lower relative losses.

(c) It is possible to build the engine solely of pressed sheet parts simply welded together, and without precision machining or complicated and expensive mounting work. Only a simple fuel system and an ignition system are necessary.

(d) The engine does not necessarily need bearings for suspension of the rotor as this is kept in position by the bypass air stream.

This permits omission of a lubrication system. The engine works without of any lubricants and any cooling of the bearings and reinforcements in the rotor and in the case for distribution of the bearings forces are also not necessary.

(e) Since the combustion in the rotor is a constant process the exhausted gases as well as the compressed air do not pass turbine vanes, so that there should be no oscillating pressures in the gas channels and therefore no or only little noise.

(f) Since the rotor is rotating freely without rigid bearings and is completely self centralizing no vibration or forces can be transferred from the rotor onto the case, enabling an ultra light design of the latter.

(g) The rotor with its comparatively large diameter and its very high rotational speed acts as a heavy stabilizing gyro which is capable of keeping the running engine and also the whole attached vehicle constantly in a stable horizontal position, when a gyro stabilizing device acting like the Sperry horizon gyro principle is provided.

(h) The temperature and speed of the exhaust gas mixture is so low that no danger exists for instance to persons standing near a running engine.

(i) As a fuel not only gasoline but also light fuel oil, kerosene, butane, propane, methane and mixtures thereof can be used.

(k) The shape of the engine which is about that of a flat pill easily allows its use for instance to propel a hovering chair whereby it is mounted in the space between the legs and keeping the whole vehicle constantly horizontal during flight.

(l) Another possibility is to build the engine completely within the shape of an airfoil without outside engine nacelles or other exposed parts causing additional drag.

(m) For use in a conventional road vehicle the engine as a flat part does not need much space above the bottom of the chassis. Furthermore the thrust producing air stream, when e. g. blowing vertically downwards, can easily and instantly be alternatively directed backwards and forwards thus producing forward (propelling) respectively backward (braking) thrust forces.

(n) Since the engine does not include any metallic friction parts or surfaces sliding on one another, no lubricants are present and all parts are self cleaning in the combustion process, the whole engine will not wear or deteriorate even during long running periods. Maintenance and repair work therefore is diminished to the utmost imaginable degree.

(o) To finally give an impression of the capabilities of an already designed and thoroughly calculated sample engine according to my invention, the following technical data can be stated:

| | |
|---|---|
| Overall diameter | 600 millimeters. |
| Overall height | 220 millimeters. |
| Total weight, without fuel tank | 22 kilograms. |
| Air intake | 10 kp./sec. |
| Thrust | 170 kp. |
| Fuel consumption (one stage compression) | 0.175 kg./kp./hr. (light fuel oil). |
| Fuel consumption (two stage compression) | 0.09 kg./kp./hr. (light fuel oil). |
| Exhaust velocity: At thrust nozzles | 172 m./sec. |
| At 1 m. horiz. distance from engine about | 2–3 m./sec. |
| Exhaust temperature | +26° C. + ambient temperature. |
| Maximum ceiling (of engine) with 100% power | 6.100 meters. |

Having thus fully described the most important features of my invention, the possible alterations of which also come within the scope of this disclosure and are desired to be protected, what I claim is:

1. In a jet reaction motor, in combination, a rotor comprising a hollow center disc; fuel supply means communicating with the interior of said center disc at a central region thereof; a plurality of fuel spray nozzles arranged angularly spaced from each other along the periphery of said center disc and communicating with the interior thereof; a housing surrounding said center disc spaced therefrom, said housing having a top wall and a bottom wall each formed with a central air inlet opening and a peripheral wall; a plurality of partitions extending angularly spaced from each other in radial direction from said air inlet openings to said peripheral wall of said housing and between said top and bottom walls thereof so as to define between themselves, the inner surface of said housing and the outer surface of said center disc a plurality of compression and combustion chambers communicating at the inner ends thereof with said air inlet openings; ignition means in each of said chambers in the space between the periphery of said center disc and the peripheral wall of said housing; and a tangential nozzle for each chamber fixed to said peripheral wall of said housing and communicating at the inner end thereof with the interior of the respective chamber and at the outer end thereof with the surrounding atmosphere, whereby during rotation of said rotor air entering through said inlet openings into said chambers will be compressed therein, mixed with the fuel ejected in atomized form through said fuel nozzles and ignited by said ignition means so that the combustion gases will leave through said tangential nozzles to provide a rotational thrust for said rotor.

2. In a jet reaction motor, in combination, a rotor comprising a hollow center disc; a hollow shaft coaxially arranged with said center disc fixedly connected at one end thereto and adapted to be connected at the other end thereof to a fuel supply for feeding fuel into the interior of said hollow center disc; a plurality of fuel spray nozzles arranged angularly spaced from each other along the periphery of said center disc and communicating with the interior thereof; a housing surrounding said center disc spaced therefrom, said housing having a top wall and a bottom wall each formed with a central air inlet opening and a peripheral wall; a plurality of partitions extending angularly spaced from each other in radial direction from said air inlet openings to said peripheral wall of said housing and between said top and bottom walls thereof so as to define between themselves, the inner surface of said housing and the outer surface of said center disc a plurality of compression and combustion chambers communicating at the inner ends thereof with said air inlet openings; ignition means in each of said chambers in the space between the periphery of said center disc and the peripheral wall of said housing; and a tangential nozzle for each chamber fixed to said peripheral wall of said housing and communicating at the inner end thereof with the interior of the respective chamber and at the outer end thereof with the surrounding atmosphere, whereby during rotation of said rotor air entering through said inlet openings into said chambers will be compressed therein, mixed with the fuel ejected in atomized form through said fuel nozzles and ignited by said ignition means so that the combustion gases will leave through said tangential nozzles to provide a rotational thrust for said rotor.

3. In a jet reaction motor, in combination, a rotor comprising a hollow center disc; a hollow shaft coaxially arranged with said center disc fixedly connected at one end thereto and adapted to be connected at the other end thereof to a fuel supply for feeding fuel into the interior of said hollow center disc; a plurality of fuel spray nozzles arranged angularly spaced from each other along the periphery of said center disc and communicating with the interior thereof; a housing surrounding said center disc spaced therefrom, said housing having a top wall and a bottom wall each formed with a central air inlet opening and a peripheral wall; a plurality of partitions extending angularly spaced from each other in radial direction from said air inlet openings to said peripheral wall of said housing and between said top and bottom walls thereof so as to define between themselves, the inner surface of said housing and the outer surface of said center disc a plurality of compression and combustion chambers communicating at the inner ends thereof with said air inlet openings; ignition means in each of said chambers in the space between the periphery of said center disc and the peripheral wall of said housing; flame holder means in each of said chambers inwardly of said ignition means; and a tangential nozzle for each chamber fixed to said peripheral wall of said housing and communicating at the inner end thereof with the interior of the respective chamber and at the outer end thereof with the surrounding atmosphere, whereby during rotation of said rotor air entering through said inlet openings into said chambers will be compressed therein mixed with the fuel ejected in atomized form through said fuel nozzles and ignited by said ignition means so that the combustion gases will leave through said tangential nozzles to provide a rotational thrust for said rotor.

4. A jet reaction motor as set forth in claim 1, wherein said peripheral wall is formed by a plurality of curved wall portions, one for each chamber and each extending from the outer edge of the trailing partition of each chamber to a portion of the leading partition spaced from the outer edge thereof and the tangential nozzle of each chamber passes to the outside thereof in the region of the outer edge of the trailing partition of the respective chamber.

5. In a jet reaction motor, in combination, a rotor comprising a hollow center disc; a hollow shaft coaxially arranged with said center disc fixedly connected at one end thereto and adapted to be connected at the other end thereof to a fuel supply for feeding fuel into the interior of said hollow center disc; a plurality of fuel spray nozzles arranged angularly spaced from each other along the periphery of said center disc and communicating with the interior thereof; a substantially lentil shaped housing surrounding said center disc spaced therefrom, said housing having a top wall and a bottom wall each formed with a central air inlet opening and a peripheral wall; a plurality of partitions extending angularly spaced from each other in radial direction from said air inlet openings to said peripheral wall of said housing and between said top and bottom walls thereof so as to define between themselves, the inner surface of said housing and the outer surface of said center disc a plurality of compression and combustion chambers communicating at the inner ends thereof with said air inlet openings; ignition means in each of said chambers in the space between the periphery of said center disc and the peripheral wall of said housing; flame holder means in each of said chambers inwardly of said ignition means; and a tangential nozzle for each chamber fixed to said peripheral wall of said housing and communicating at the inner end thereof with the interior of the respective chamber and at the outer end thereof with the surrounding atmosphere, whereby during rotation of said rotor air entering through said inlet openings into said chambers will be compressed therein, mixed with the fuel ejected in atomized form through said fuel nozzles and ignited by said ignition means so that the combustion gases will leave through said tangential nozzles to provide a rotational thrust for said rotor.

6. A jet reaction motor comprising, in combination, rotor means including a hollow center disc, fuel supply means communicating with the interior of said disc at a central region thereof, a plurality of fuel spray nozzles arranged angularly spaced from each other along the periphery of said center disc and communicating with the interior thereof, a housing surrounding said center disc spaced therefrom and having a top wall and a bottom wall each formed with a central air inlet opening and a peripheral wall, a plurality of partitions extending angularly spaced from each other in radial direction from said air inlet openings to said peripheral wall of said housing and between said top and bottom walls thereof so as to define between themselves, the inner surface of said housing and the outer surface of said center disc a plurality of compression and combustion chambers communicating with the inner ends thereof with said air inlet openings, ignition means in each of said chambers in the space between the periphery of said center disc and the peripheral wall of said housing, flame holder means in each of said chambers inwardly of said ignition means, a tangential nozzle for each chamber fixed to said peripheral wall of said housing and communicating with the inner end thereof with the interior of the respective chamber and at the outer end thereof with the air surrounding said housing, and a plurality of vanes angularly spaced from each other and respectively projecting from said top and bottom walls of said housing adjacent said air inlet openings therein in substantially radially outward direction; and a casing surrounding said rotor means spaced therefrom and out of mechanical contact with any part thereof, said casing having a pair of air inlet means having inner ends in the region of said air inlet openings in said housing, respectively, and at least one thrust nozzle extending in a selected direction and communicating at the inner end thereof with the interior of said casing and at the outer end thereof with the surrounding atmosphere so that during rotation of said rotor means in said casing air entering through said air inlet means in said casing and said air inlet means in said housing into said chambers will be compressed therein, mixed with the fuel ejected in atomized form through said fuel nozzles, and ignited by said ignition means so that the combustion gases will leave through said tangential nozzles to provide a rotational thrust for said rotor means while the vanes of the rotating rotor means will provide two compressed air streams passing from said inlet means in said casing in the space between the inner surface of the latter and the outer surface of said housing of said rotor means to keep the latter out of contact with said casing, and said two streams of compressed air will mix with the combustion gases emanating from said thrust nozzles of said housing to leave said casing through said thrust nozzles thereof to produce a thrust in said selected direction.

7. A jet reaction motor as set forth in claim 6, wherein said housing has a substantially lentil shaped configuration, wherein said casing has a configuration similar to that of said housing, wherein said air inlet means in said casing are axially aligned with said air openings in said housing, and wherein said casing is provided with a plurality of thrust nozzles arranged adjacent the periphery thereof and projecting in substantially axial direction downwardly therefrom.

8. A jet reaction motor as set forth in claim 6, wherein said housing has a substantially lentil shaped configuration, wherein said casing has a configuration similar to that of said housing, wherein said air inlet means have respectively inlet ends extending substantially parallel to the axis of said rotor means and facing one end of said casing and outlet ends substantially axially aligned with said air inlet openings in said housing, and wherein said casing is provided with at least one thrust nozzle extending in a direction substantially normal to the axis of said rotor means from the other end of said casing.

References Cited by the Examiner
UNITED STATES PATENTS

| | | | |
|---|---|---|---|
| 2,465,856 | 3/49 | Emigh | 60—39.35 |
| 2,660,859 | 12/53 | Chamberlain | 60—39.35 |
| 2,850,250 | 9/58 | Smith | 60—39.35 |
| 3,008,293 | 11/61 | Servanty | 60—39.34 |

SAMUEL LEVINE, *Primary Examiner.*